Sept. 22, 1964 N. G. VOGL, JR 3,150,269

MAGNETIC SWITCHING DEVICE

Filed Oct. 13, 1960 4 Sheets-Sheet 1

INVENTOR
NORBERT G. VOGL JR.

BY Ronald J. Kransdorf

AGENT

Sept. 22, 1964 N. G. VOGL, JR 3,150,269

MAGNETIC SWITCHING DEVICE

Filed Oct. 13, 1960 4 Sheets-Sheet 4

3,150,269
Patented Sept. 22, 1964

3,150,269
MAGNETIC SWITCHING DEVICE

Norbert G. Vogl, Jr., Wappingers Falls, N.Y., assignor to International Business Machines Corporation, New York, N.Y., a corporation of New York Filed Oct. 13, 1960, Ser. No. 62,454
7 Claims. (Cl. 307—88)

The invention relates to switching devices, and more particularly to improved magnetic load sharing switches and a method of constructing the same.

Switching devices capable of applying power to any of a plurality of loads find many uses in the electrical arts. One example of such use is in the control of a magnetic core memory array of the type employed in data processing machines. Such arrays generally include at least one plane provided with separate row windings, each inductively coupling a row of cores, and separate column windings, each inductively coupling a column of cores. If more than one plane is employed, the corresponding row windings and corresponding column windings for each of the planes are respectively connected so that a selected row and column winding intersect a group of cores occupying corresponding positions in the memory planes. Excitation of both a selected row and column winding causes the cores at the intersections of these windings to have their magnetic condition changed. Thus, a group of memory cores, corresponding to the bits of a data word, may be selected by applying a drive pulse coincidentally to a selected row and column winding.

Selection of a row winding and a column winding in such an array may be accomplished by a magnetic switch. One type of magnetic switch is the load sharing type, which consists of a plurality of magnetic cores having a plurality of windings inductively coupled thereto in accordance with a combinational code. One class of these load sharing switches is disclosed by G. Constantine in the IBM Journal of Research and Development, vol. 2 (July 1958), pp. 204–211, entitled "A Load Sharing Matrix Switch," and in copending application, Serial No. 745,395, filed June 30, 1958, and assigned to the assignee of the instant application. This class of switches, which will hereinafter be referred to as Constantine switches, are so designed that, to obtain $n$ outputs, it is necessary to have at least $2n+1$ wires passing through each of the switch cores. It can be seen that, for even relatively small values of $n$, the required number of wires passing through a core could get prohibitively large. It is more difficult and therefore more expensive to thread this larger number of wires through a core and it is often necessary to also use large diameter cores, increasing the physical dimensions of the switch. Also, the inter-turn capacitance of the unused windings combines with the inductance of the windings themselves to form tank circuits, giving rise to harmful oscillations or ringing.

Two classes of improved load sharing switches—those disclosed by M. Marcus in an article entitled, "Doubling the Efficiency of the Load Sharing Matrix Switch," appearing in the IBM Journal of Research and Development, vol. 3, April 1959, pp. 194–196, and in a copending application filed November 20, 1958, having Serial No. 775,279, which will hereinafter be referred to as Marcus switches; and those disclosed by R. T. Chien in an article entitled, "Orthogonal Matrices, Error Correcting Codes and Load-Sharing Matrix Switches," appearing in the IRE Transactions On Electronic Computers, vol. EC–8, September 1959, p. 400, and, in more detail, in a copending application filed August 10, 1960, having Serial No. 48,712 which will hereinafter be referred to as Chien switches, both of which are assigned to the assignee of the present application—require, at least $(n+2)$ windings per core to achieve an $n$ output switch. A third class of improved matrix switches—those disclosed by L. A. Russell, in a copending application filed June 9, 1960, having Serial No. 35,051, which is assigned to the assignee of the present application and will hereinafter be referred to as Russell switches—requires exactly $(n+2)$ windings per core to achieve an $n$ output switch.

It can be seen that all of the above mentioned improved matrix switches suffer from the same limitation (although to a lesser extent) as the Constantine switches, namely, that as the number of outputs from the switch increases, the number of windings-per-core becomes extremely large. As mentioned before, these added windings have the disadvantages of (1) increasing the physical dimensions of the switch, (2) increasing the difficulty and therefore the overall cost of fabricating the switch, (3) giving rise to a large number of undesired ringing circuits, (4) placing a practical limit on the number of outputs which can be derived from a single switch, and (5) imposing operational speed limitations on the switch.

It is, therefore, an object of this invention to provide an improved class of load sharing switches which require a minimum number of windings-per-core for a desired number of outputs.

Another object of the invention is to provide a class of matrix switches which are generally simpler to fabricate than those heretofore known.

In accordance with these objects, this invention utilizes as essential elements a plurality of magnetic elements at least some of which are stable only at a near zero remanent induction level. These elements are arranged in groups of at least two elements each. The several elements are coupled by a plurality of input windings wound in accordance with an input combinational code, such as those disclosed in the beforementioned applications of Constantine, Marcus and Chien or variations thereof. Selected combinations of the input windings are coincidentally energized to cause a net flux change of predetermined magnitude in at least the elements of one of said groups of elements. There are also a plurality of output windings, at least one output winding coupling all the elements from each of the groups of elements in accordance with an output combinational code, such as those mentioned above. The sense in which the individual output windings couple the magnetic elements is such that voltages induced by the net flux changes in the magnetic elements will cancel in all but one of the output windings and will be additive in that output winding to generate an output voltage of predetermined magnitude. Switches constructed as above described are substantially noiseless. It should be understood, however, that the teachings of this invention may also be applied to provide switches which are not entirely noiseless, as will appear later herein.

The foregoing and other objects, features and advantages of the invention will be apparent from the following more particular description of preferred embodiments of the invention, as illustrated in the accompanying drawings.

Figure 8A:
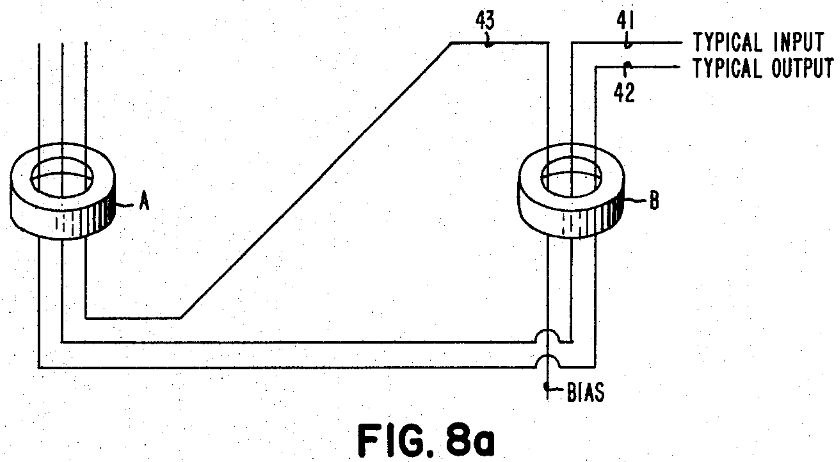

FIG. 8*a* is a schematic drawing of a second magnetic element suitable for use with any of the switches shown in FIGS. 1–5 and 9.

Figure 8B:
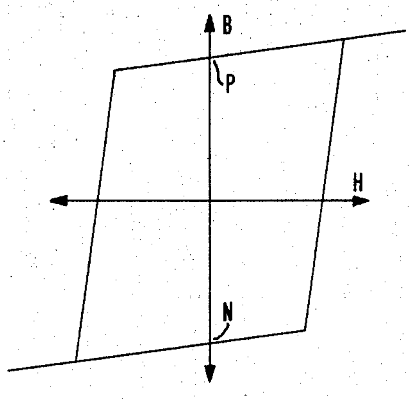

FIG. 8*b* is a diagrammatic representation of the hysteresis loop for the individual cores shown in FIG. 8*a*.

Figure 9:
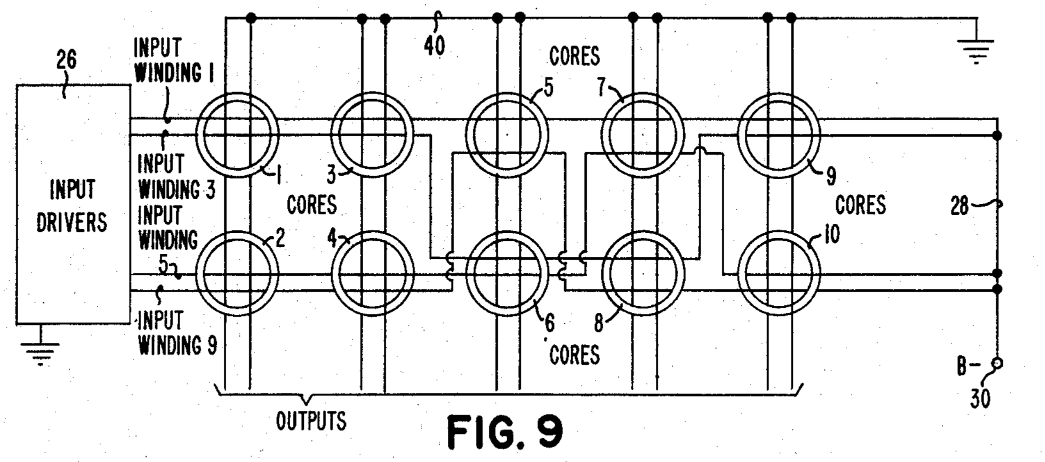

FIG. 9 is a schematic drawing of a 16-input 10-output switch constructed in accordance with the teachings of this invention with only a representative sample of the input windings being included.

The input winding pattern for the Constantine switches (the switches disclosed in the beforementioned Constantine application, Serial No. 745,395) are derived by expanding the basic matrix pattern

| | |
|---|---|
| 1 | 1 |
| 1 | 0 |

where a column represents a magnetic element and a row represents an input winding coupling the elements. The 1 and 0 symbols indicate the sense of coupling of the input windings with the elements. According to the convention adopted herein, a 1 at the intersection of a row and a column indicates that a current of predetermined polarity will drive the element (i.e., create magnetic flux therein) in a positive direction. A 0 at the intersection of a row and column indicates that current of the same predetermined polarity in the winding will drive the element in a negative direction. For input currents of the opposite polarity the converse will be true. These symbol conventions will have the same significance when used in connection with input winding patterns throughout this application.

It will be noted that the pattern shown above is the complete input winding pattern for a switch having two cores and two outputs. The basic matrix pattern may be expanded to give the input winding pattern for higher order switches in accordance with the following matrix:

| | |
|---|---|
| Basic matrix pattern | Basic matrix pattern |
| Basic matrix pattern | Complement of basic matrix pattern |

where the entire winding pattern for a lower order switch is substituted for the basic winding pattern in the above matrix to derive the next succeeding higher order switch. Following the rules outlined above, a Constantine switch having four cores and four outputs would have the winding pattern:

| | | | |
|---|---|---|---|
| 1 | 1 | 1 | 1 |
| 1 | 0 | 1 | 0 |
| 1 | 1 | 0 | 0 |
| 1 | 0 | 0 | 1 |

With a switch having a winding pattern as derived above, there will be, for any combination of positive and negative currents on the input lines, a net flux change in one direction in only one of the magnetic elements and cancelling flux changes in the rest. The nature of these winding patterns is also such that there will always be $n$ magnetic elements in a switch and $n$ input windings, where $n$ is a positive integer which is equal to a power of 2. A single output winding is provided for each element—there being, therefore, $n$ outputs from the switch.

With the switch as described above, each input winding must carry currents of both polarities. Since the drivers generally used with the Constantine switches are capable of supplying only positive signals, it is desirable to use a pair of input windings and a pair of unipolar drivers in place of each of the single windings represented above. The first winding of each pair is provided in accordance with the pattern shown, and the second winding of each pair is provided in accordance with the complement of the pattern shown. Therefore, a Constantine switch having $n$ outputs will have $2n$ input windings plus one output winding, or $2n+1$ windings per core. The Constantine switches display load sharing characteristics only at the input windings.

The Russell switches (those disclosed in copending application Serial No. 35,051) possess load sharing properties at only the output windings. The winding pattern for these load sharing output windings is generally the same as that disclosed for the input windings of the Constantine switches. Each magnetic element of a Russell switch is coupled by two unipolar current carrying input windings, one for read out and one for write in, and by all of the output lines. There will, therefore, be $(n+2)$ windings-per-core for an $n$ output Russell switch.

The present invention recognizes the fact that, where a relatively large number of outputs are desired, the number of windings-per-core for a given number of outputs can be substantially reduced by designing a switch which possesses load sharing properties at both its input and its output windings.

Figure 1:
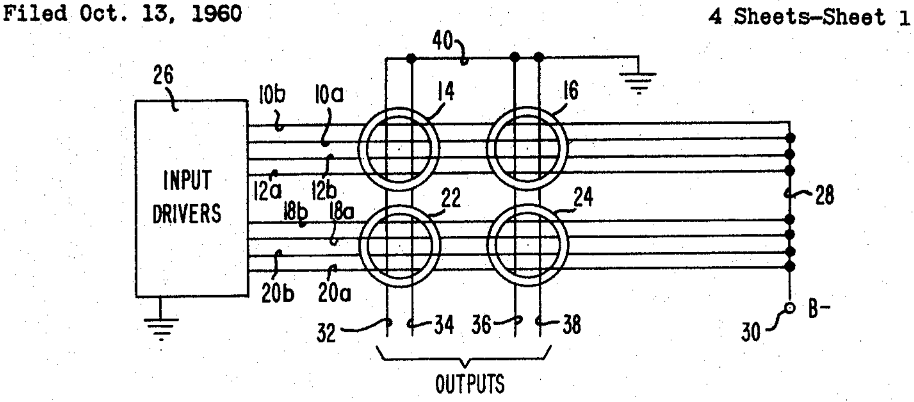
FIG. 1 is a schematic drawing of an 8-input 4-output magnetic switch constructed in accordance with this invention.

Referring now to FIG. 1, there is shown a schematic diagram of an 8-input 4-output matrix switch designed in accordance with one embodiment of this invention. In this drawing, and in those to follow the following conventions will be used: (1) all input windings will be assumed to carry unipolar current flowing from the drivers 26 to reference line 28; (2) the magnetic elements, represented by toroids, will be driven in a positive direction by the application of current on an input winding which passes over the left side of the toroid and under the right side, thus carrying current "down" (into the paper) through the core; (3) the elements will be driven in the negative direction by the application of current to an input winding which passes under the left side of the toroid and over the right side, thus carrying current "up" (out of the paper) through the element; (4) a net change of magnetic flux in a magnetic element in the positive direction will induce a negative output voltage in an output winding which passes over the top of the toroid and under the bottom (i.e., a winding passing down into the paper) and will induce a positive output voltage in an output winding which passes under the top of the toroid and over its bottom (i.e., a winding passing up out of the paper). A net change in flux in a magnetic element in the negative direction will have a converse effect in the output windings. It is to be understood that, while in the drawing the magnetic elements are shown as toroidal magnetic cores, any suitably shaped magnetic element may be used. Moreover, as described with reference to FIG. 8, a "magnetic element" as the term is used herein, may comprise more than one core.

In FIG. 1, input windings 10*a* and 12*a* couple magnetic elements 14 and 16 in accordance with the basic Constantine pattern. Windings 18*a* and 20*a* similarly couple magnetic elements 22 and 24. Associated with each of the input windings 10*a*, 12*a*, 18*a* and 20*a* is a complementarily wound input windings 10*b*, 12*b*, 18*b* and 20*b*, respectively. These windings are connected to be selectively energized by input drivers 26 and are connected through common line 28 to a source of negative potential 30. The input drivers may be, for example, a series of electronic or electro-mechanical switches, one for each input line, which may be selectively closed by an external control means to complete a circuit from ground through the selected input winding to B— terminal 30. Each magnetic element of the two element Constantine type switches is coupled by two output windings, output windings 32 and 34 coupling elements 14 and 22, and output windings 36 and 38 coupling magnetic elements 16 and 24. For this embodiment, each output winding pair is shown as being connected in accordance with the basic Constantine pattern. One end of each output winding is connected through common line 40 to ground. The method of obtaining an output voltage from this circuit can best be understood by referring to a pair of examples.

(1) Assume that a negative (read-out) output voltage is desired on output winding 34. This would be accomplished by closing switches to energize input windings 10*a*, 12*a*, 18*b* and 20*b*. The positive input signal on line 10*a* would induce flux in elements 14 and 16, tending to drive these elements in a positive direction. The input current appearing on the winding 12*a* would induce a flux in element 14 which re-enforces that generated by winding 10*a*, and to generate a flux in the element 16 which would tend to cancel that generated by the winding 10*a*. There would, therefore, be a net flux change in the positive direction in the element 14 and no net flux change in the element 16.

The input windings 18*b* and 20*b* induce fluxes in the elements 22 and 24, which are the complement of those induced in the elements 14 and 16 by the windings 10*a* and 12*a* respectively. A net flux change in the negative direction therefore occurs in the element 22 and no net flux change occurs in the element 24. The output winding 32 passes over the top and under the bottom of both elements 14 and 22 and, therefore, has opposing voltages induced in it and no net output voltage. Output winding 34, however, passes over the top and under the bottom of element 14 but under the top and over the bottom of element 22; it, therefore, has a negative voltage induced in it by the next flux changes in each of these elements and a negative output voltage appears on this winding. Since no net flux change occurs in magnetic elements 16 and 24, no output signal is generated on the output lines 36 and 38.

(2) Assume it is desired to generate a positive (write-in) output on the winding 34. In driving a memory, a write output always follows a read output on a given line. This is accomplished by energizing the complementarily wound input windings 10*b*, 12*b*, 18*a* and 20*a*. Windings 10*b* and 12*b* induce aiding negative fluxes in core 14, but they induce cancelling fluxes in core 16. Windings 18*a* and 20*a* induce aiding positive fluxes in core 22, but they induce cancelling fluxes in core 24. The negative flux change in core 14 induces positive voltages in windings 32 and 34. The positive flux change in core 22 induces a negative voltage in winding 32 and a positive voltage in winding 34. The positive voltages in winding 34 add to provide the desired output, while the opposed voltages in winding 32 cancel.

Figure 7:
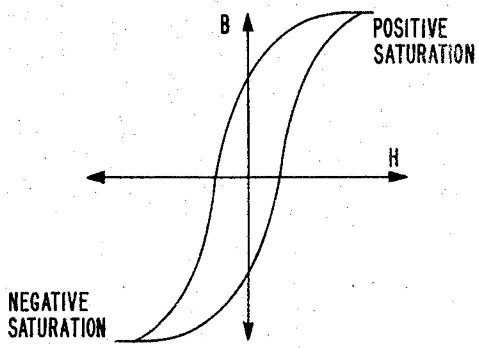
FIG. 7 is a diagrammatic representation of the hysteresis loop for a magnetic element suitable for use with any of the switches shown in FIGS. 1–5 and 9.

From the above description, it is apparent that when an input current is applied, most of the magnetic elements must be capable of being driven in either direction and therefore that these magnetic elements must have a zero or near zero remanent induction level (i.e. must normally exist in an unsaturated state so as to be capable of being driven into either positive or negative saturation). The zero remanent induction level is the point at the intersection of the B and the H lines in FIGS. 7 and 8*b*. The other magnetic elements, namely those in the top row, need be capable of being driven only in one direction, but some means must be supplied for resetting these elements. In practice, a write-in current on a complementarily wound winding will follow each read-out current and these write-in currents will reset all the magnetic elements. If the write-in current is not available, the elements may be reset by a D.-C. bias winding (for example as shown and described with reference to FIG. 8*a*) or, where elements having the hysteresis curve shown in FIG. 7 are used, the elements may be allowed to drift back to their zero-remanent induction level. Suitable magnetic elements would therefore be magnetic cores having narrow, relatively linear hysteresis loops, such as those used in transformers and illustrated in FIG. 7, or square loop cores arranged and biased as shown in FIG. 8*a*. The element as shown in FIG. 8*a* consists of two magnetic cores, A and B, each having the hysteresis loop shown in FIG. 8*b* and each of which is coupled in the same sense by an input winding 41 and an output winding 42. A bias winding 43 couples the cores A and B in opposite sense. With this arrangement, one of the cores, for example, the A core, is biased to remain at a negative saturation level (point N on the hysteresis loop); while the other core, for example, the B core, is biased to remain at a positive saturation level (point P on the hysteresis loop). An input signal on an input line passing through both of the cores will induce no flux change in one of the cores but will induce the desired flux change in the other core, this flux change, in turn, inducing the desired output voltage. At the end of the input signal, the switched core will be restored to its initial condition by the signal on the bias winding, or by the driver supplying a current of opposite polarity to input winding 41.

The switch shown in FIG. 1 is the lowest order switch having a Constantine winding pattern for both the input windings and the output windings. The number of outputs from this switch may be increased by increasing the number of magnetic elements in each row (by using a higher order Constantine input pattern), by increasing the number of magnetic elements in each column (by using a higher order Constantine output pattern), or by a combination of these two procedures. The method of expanding the magnetic switches of this invention is generally the same for all embodiments and will, therefore, be described in detail after looking at the other embodiments.

The beforementioned copending application of Marcus discloses a matrix switch winding pattern which is somewhat more efficient than that disclosed by Constantine. This pattern is derived by starting with the basic winding pattern

| |
|---|
| 1 |
| 0 |

and expanding it in the following manner:

(1) Form two columns of the next higher order winding pattern for each column of the present order winding pattern by inserting the existing column values in the first three quadrants of a matrix and inserting the complement of the existing column values in the fourth quadrant, thus

| | |
|---|---|
| Existing column values | Existing column values |
| Existing column values | Complement of existing column values |

(2) Form the first column of the new pattern by extending the first column of the existing winding pattern in both directions by adding the same values to each side of the existing values until the number of digits in the first column equals the number in the other columns, thus

↑
1
1
| 1 |
| 0 |
0
0
↓

The next higher order winding pattern will accordingly have one more than twice the number of columns in the existing pattern.

As an illustrative example, consider the manner of deriving the winding pattern for a three-core four-input switch.

First, the basic pattern is expanded by placing the column value of the basic pattern $$\begin{pmatrix}1\\0\end{pmatrix}$$

in the first three quadrants of a matrix and the complement of the column value for the basic pattern in the fourth quadrant, thus $$\begin{array}{c|c}1&1\\0&0\\\hline 1&0\\0&1\end{array}$$

Then, in accordance with rule 2, the "basic winding pattern" is expanded by adding the same value to each end so that the pattern for the first column becomes:

1
1
0
0

Now combining the first column found by rule 2 with the two additional columns found by the rule 1, the winding pattern for the 3-core 4-input switch is 1 1 1
1 0 0
0 1 0
0 0 1

Figure 2:
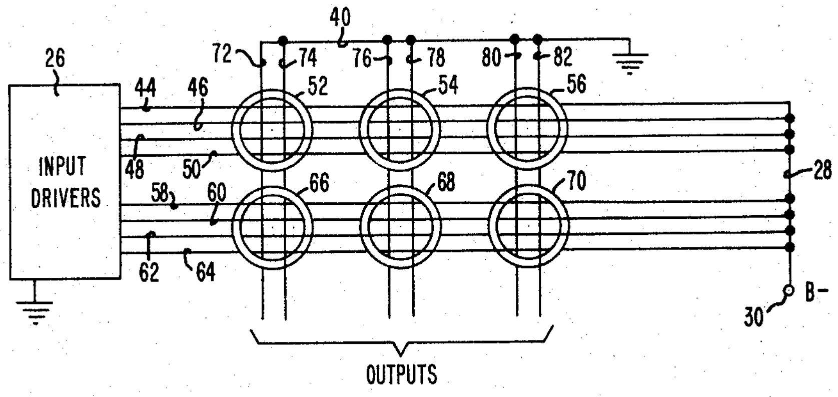
FIG. 2 is a schematic drawing of an 8-input 6-output magnetic switch constructed in accordance with an alternative embodiment of this invention.

Referring now to FIG. 2, and keeping in mind the winding conventions previously described, it is seen that the four input windings 44, 46, 48 and 50 couple the three magnetic elements 52, 54 and 56 in accordance with the above tabulated Marcus pattern. The four input windings 58, 50, 62 and 64 couple the three cores 66, 68 and 70 in accordance with the same winding pattern. As in FIG. 1, the input drive windings are connected to be selectively energized by input drivers 26 and are connected by a common line 28 to a source of negative potential 30. Output windings 72 and 74 couple magnetic elements 52 and 66 in accordance with the beforementioned Constantine pattern; output windings 76 and 78 couple magnetic elements 54 and 68 and output windings 80 and 82 couple magnetic elements 56 and 70 in accordance with the same winding pattern. Common line 40 connects one end of each of the output windings to ground.

The operation of this circuit, which is similar to that of the circuit shown in FIG. 1, will be illustrated by the following example.

Assume that it is desired to obtain a negative output signal on output winding 76. This would be accomplished by applying positive drive signals to input windings 44, 48, 58 and 62. The positive going fluxes induced in the elements 52, 54 and 56 by the positive signal on input winding 44 would be cancelled in elements 52 and 56 by the negative going fluxes induced by the positive current on winding 48 and would be augmented in magnetic element 54 by the positive going flux induced by winding 48. The positive currents on input windings 58 and 62 cause corresponding flux changes in magnetic elements 66, 68 and 70. The result is a net positive flux change in magnetic elements 54 and 68 and no net flux change in the other elements of the switch. The net positive flux change in the element 54 would induce negative voltages in output windings 76 and 78, while the positive going flux change in magnetic element 68 would induce a negative voltage in output winding 76 and a positive voltage in output winding 78; the desired negative output voltage would, therefore, appear on winding 76.

The beforementioned copending application of Chien discloses several improved winding patterns for loading sharing magnetic switches, which, for large switches, are even more efficient than those of either Constantine or Marcus. Only one of the methods disclosed by Chien for deriving a winding pattern, that called Lemma 2 in the Chien application, will be described here and applied to the present invention; however, it is to be understood that a winding pattern derived by any of the methods disclosed in Chien may be used for the input windings in the present invention. The method of deriving a winding pattern employing Lemma 2 is described starting on page 23 of the copending Chien application and may be summarized as follows:

This method, which is applicable only where $n$, the number of inputs, is a multiple of 4 and where $(n-1)$ is a prime number $p$, consists of the following steps:

(1) List all numbers from 0 to $(p-1)$, find all squares, and reduce these squares by multiples of $p$ so that the resulting numbers are less than $p$. These numbers are called quadratic residues of $p$.

(2) Lay out in a column the sequence $a_0, a_1, a_2, a_3, a_4, \ldots a_{p-1}$ and insert a 1 for $a_0$ and wherever the subscript is a quadratic residue and a 0 where the subscript is not a quadratic residue.

(3) Cyclically shift the sequence obtained in step 2 to obtain a matrix of $p$ by $p$ according to the sequence below:

$$\begin{array}{ccccc}a_0 & a_{p-1} & a_{p-2} & \ldots & a_1\\ a_1 & a_0 & a_{p-1} & \ldots & a_2\\ a_2 & a_1 & a_0 & \ldots & a_3\\ a_3 & a_2 & a_1 & \ldots & a_4\\ \ldots & \ldots & \ldots & \ldots & \ldots\\ a_{p-2} & a_{p-3} & a_{p-4} & \ldots & a_{p-1}\\ a_{p-1} & a_{p-2} & a_{p-3} & \ldots & a_0\end{array}$$

(4) Add a row of 0's at the end of the matrix obtained in step 3 to obtain the final matrix.

As an example, consider the construction of a 4-input matrix. The prime number $p$ is then 3. The first step, according to Lemma 2, is to find all quadratic residues of numbers from 0 to $(p-1)$.

| Numbers: | Quadratic residues |
|---|---|
| 1 | 1 |
| 2 | 1 ($2\times2=4$ and $4-3=1$) |

According to the next steps:

(2) A column is laid out—

$a_0$
$a_1$
$a_2$

Substitutions made:

1
1
0

(3) The sequence is cyclically shifted—

1 0 1
1 1 0
0 1 1

(4) A row of zeros is added at the end to form the 4-input matrix pattern as follows—

1 0 1
1 1 0
0 1 1
0 0 0

As another example, consider the construction of an 8-input switch according to Lemma 2. The prime number $p$ would then be 7 $(p+1)$ equals 8, and the first quadratic residues would be computed as follows:

| Numbers: | Quadratic residues |
|---|---|
| 1 | 1 |
| 2 | 4 |
| 3 | 2 $(3\times 3=9-7=2)$ |
| 4 | 2 $(4\times 4=16-14=2)$ |
| 5 | 4 $(5\times 5=25-21=4)$ |
| 6 | 1 $(6\times 6=36-35=1)$ |

Next, the sequence is computed, cyclically shifted, and a row of zeros is added to give the following winding pattern:

1 0 0 1 0 1 1
1 1 0 0 1 0 1
1 1 1 0 0 1 0
0 1 1 1 0 0 1
1 0 1 1 1 0 0
0 1 0 1 1 1 0
0 0 1 0 1 1 1
0 0 0 0 0 0 0

Figure 3:
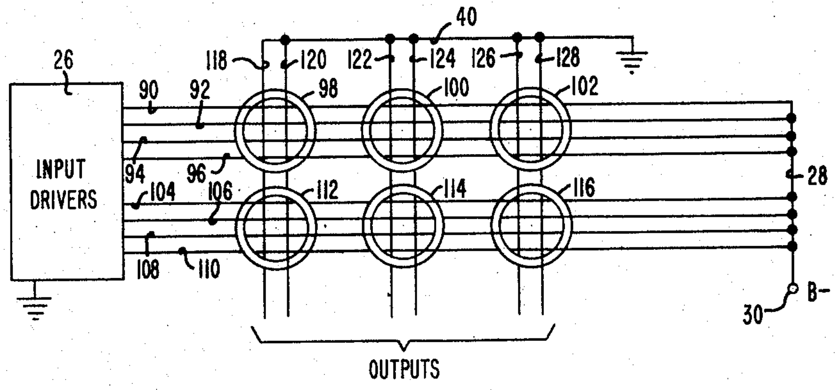
FIG. 3 is a schematic drawing of an 8-input 6-output magnetic switch constructed in accordance with still another embodiment of this invention.

Referring to FIG. 3, input windings 90, 92, 94 and 96 couple magnetic elements 98, 100, and 102 in accordance with the four-input Chien pattern shown above. Input windings 104, 106, 108 and 110 couple magnetic elements 112, 114 and 116 in accordance with the same pattern. As before, the input windings are connected to be selectively energized by input drivers 26 and are connected through common line 28 to a source of negative potential 30. The six output windings 118–128 are coupled in accordance with the same pattern as that shown in FIG. 2 and, as in that embodiment, one end of each output winding is connected through a common line 40 to ground.

It should be noted that this switch and that shown in FIG. 2 are structurally similar, differing only in the method used to derive the input winding pattern. In operation these two circuits differ only in that different input windings are energized to obtain outputs on corresponding output windings. For example, to obtain a negative output voltage on output winding 122, input windings 92, 94, 106 and 108 would be energized.

While all the matrix switches of this invention give a substantial reduction in the number of windings-per-core for a given number of outputs, it has been found that the greatest reduction in number of windings-per-core can be obtained when the input windings are wound in accordance with the Chien pattern. The following detailed description of the methods of increasing the number of outputs from the switches of this invention will therefore be given with reference to switches having Chien input patterns; however, as mentioned before, the same general method would be applied to any of the embodiments mentioned so far.

Figure 4:
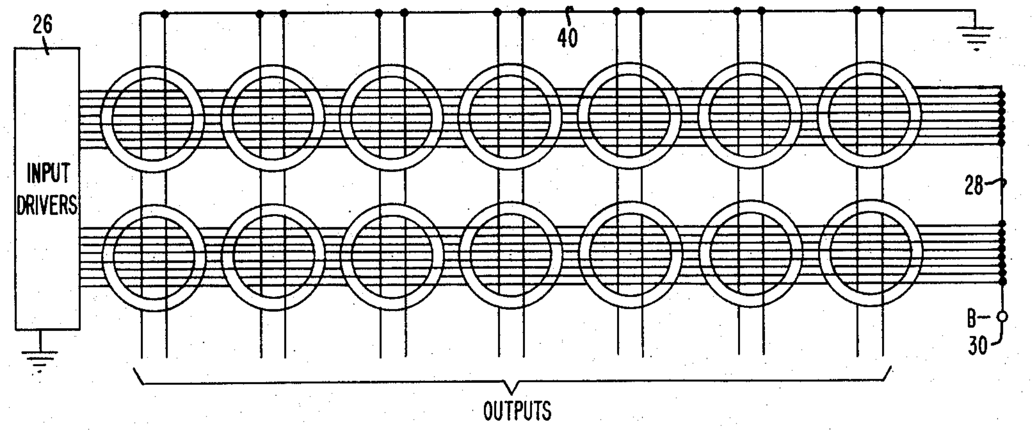
FIG. 4 is a schematic drawing of a 16-input 14-output magnetic switch constructed by expanding the switch shown in FIG. 3.

FIG. 4 illustrates one method of increasing the number of outputs from a matrix switch embodying the principles of this invention. The expansion is accomplished by substituting a higher order Chien input winding pattern for the one used before. In FIG. 3 four input windings link three cores each in accordance with the 4-input Chien pattern, whereas in FIG. 4, eight input windings link seven cores each in accordance with the 8-input Chien pattern. To obtain an output on one of the output windings of the switch shown in FIG. 4, it is necessary to energize eight input windings, four in each of the sets. In accordance with this method, the number of outputs could be further increased by coupling the input windings in accordance with a still higher order Chien input pattern. For example, if two rows of magnetic elements, each having their input windings wound in accordance with a 12-input Chien pattern were used, a switch having twenty-two outputs could be obtained.

Figure 5:
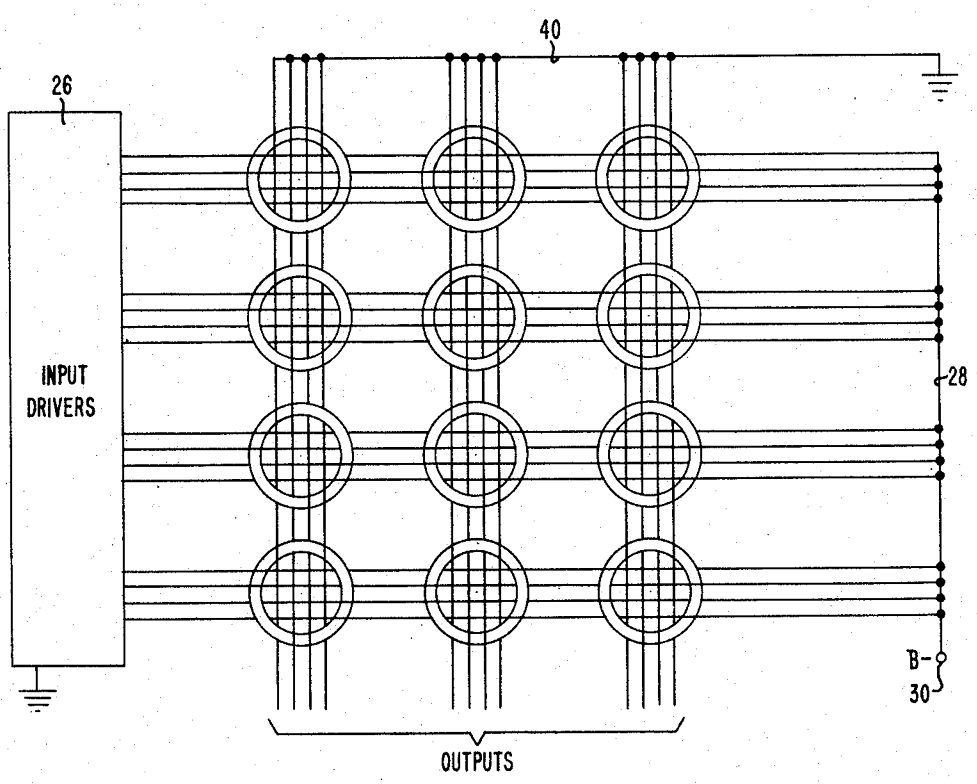
FIG. 5 is a schematic drawing of a 16-input 12-output magnetic switch constructed by expanding the switch shown in FIG. 3 in a different plane from that shown in FIG. 4.

FIG. 5 illustrates a second method of increasing the number of outputs from a magnetic switch embodying the principles of this invention. Here, the same order Chien pattern is used for the input windings as was used in FIG. 3, but a higher order Constantine pattern is used for the output windings and the number of rows of magnetic elements is, therefore, increased. As long as the output windings are wound in accordance with a Constantine pattern, it will be necessary to have a number of rows of magnetic elements equal to an integral power of two. Following this method one step further, it can be seen that the number of outputs can be increased to twenty-four by using eight rows of magnetic elements, each wound in accordance with the 4-input Chien pattern.

A third method of increasing the number of outputs from a switch embodying the concepts of this invention would be to expand the switch in both directions by combining the two methods described above. It is to be noted that the first method described above results in greater load sharing at the input windings, whereas the second method described above results in greater load sharing at the output windings; since it is generally desirable to maintain nearly equal load sharing at both the input and the output windings, the third method is the one generally employed when a large number of outputs is desired.

In all embodiments described so far, the input windings have been arranged in sets, all the windings in each set passing through all the elements in a corresponding row of elements. It is not, however, necessary that the input windings be arranged in this manner. If, for example, the switch is to be used in a computing machine having its own standard code patterns, it would be desirable to design a switch embodying the concepts of this invention which utilized the machine standard code patterns. The input winding pattern for such a switch is shown in diagrammatic form below:

| Winding/Element | 1 | 2 | 3 | 4 | 5 | 6 | 7 | 8 | 9 | 10 |
|---|---|---|---|---|---|---|---|---|---|---|
| 1 | + | | + | | + | | + | | + | |
| 2 | − | | − | | − | | + | | + | |
| 3 | − | | + | | | + | | + | − | |
| 4 | + | | − | | | + | | − | − | |
| 5 | | − | | − | | + | + | | | − |
| 6 | + | | − | | | − | | + | − | |
| 7 | − | | + | | | − | | − | − | |
| 8 | | + | | + | | − | + | | | − |
| 9 | | + | | − | + | | | + | | + |
| 10 | | − | | + | + | | | − | | + |
| 11 | − | | − | | + | | − | | + | |
| 12 | + | | + | | − | | − | | + | |
| 13 | | − | | + | − | | | + | | + |
| 14 | | + | | − | − | | | − | | + |
| 15 | | + | | + | | + | − | | | − |
| 16 | | − | | − | | − | − | | | − |

where the elements are arranged as shown in FIG. 9. Ten output windings couple the elements of this embodiment in accordance with the before described Constantine code. For the sake of clarity, only the output windings and a representative sample of the input windings are shown in FIG. 9.

Another feature common to all the embodiments described so far is that the output windings are wound in accordance with the Constantine pattern. The reason for this is that for noiseless operation the net voltage induced in all but one of the output windings must always be zero. Generally, this would require that each output winding couple an even number of cores (although, there is a possibility that some code might be devised in which the output winding would always couple an odd number of cores having zero net excitation). The Constantine code is the only one considered so far which has each winding coupling an even number of magnetic elements.

Figure 6:
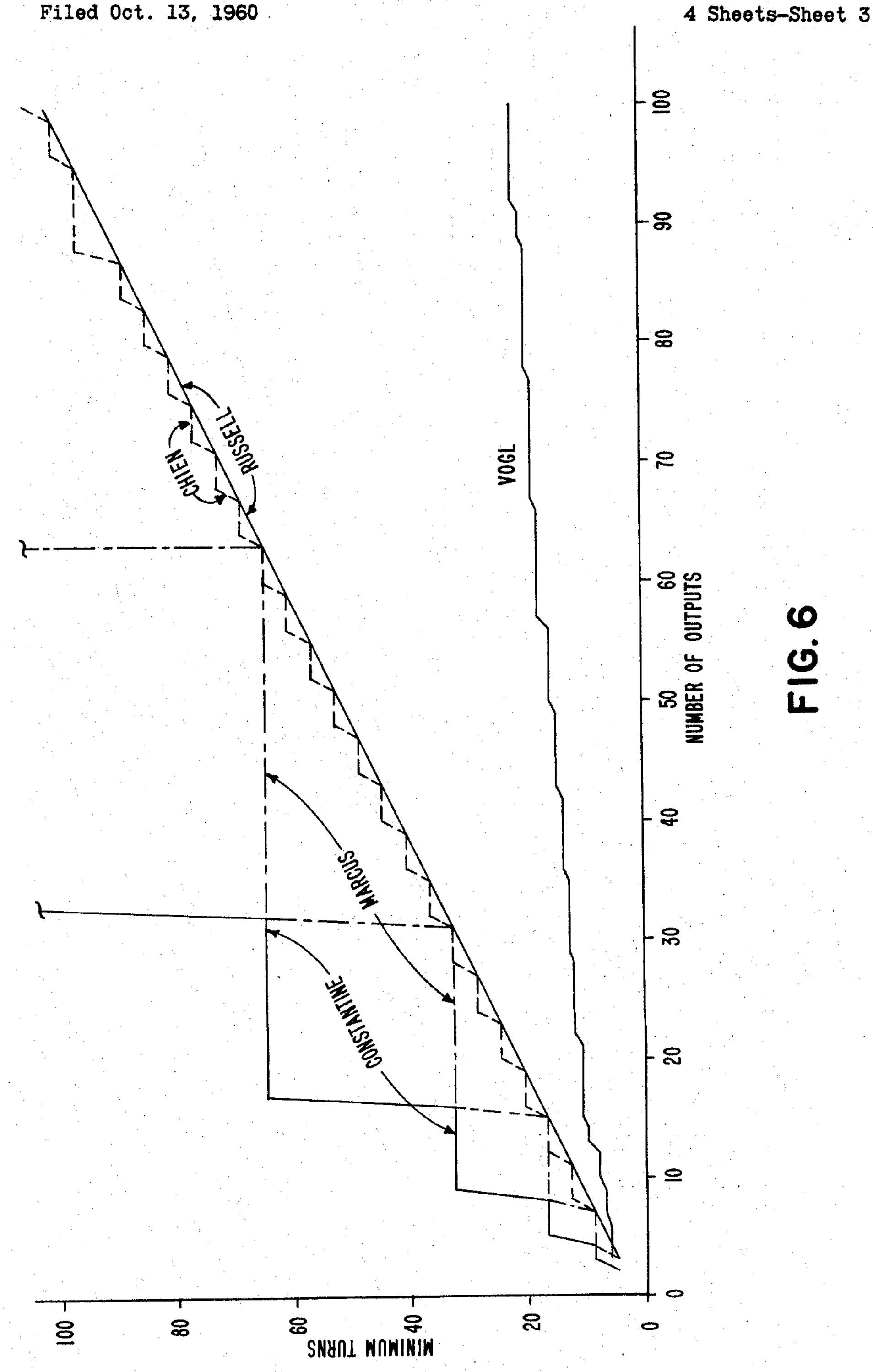
FIG. 6 is a graphic representation of the minimum number of windings-per-core versus the number of outputs from the switch for the various magnetic switches mentioned in this application.

FIG. 6 shows graphically the tremendous reduction in the number of windings-per-core for a given number of outputs which is achieved by switches embodying the concepts of this invention. The line marked "Vogl" is computed for switches constructed in accordance with the principles of this invention which have Chien input winding patterns. This line is compared with lines computed for magnetic switches disclosed in the before-mentioned Constantine, Marcus, Chien, and Russell applications.

While this invention has been described with reference to particular input and output winding patterns it is to be understood that any suitable patterns might be used. The only limitation on the input winding pattern is that for any combination of inputs, only the magnetic elements in the group of magnetic elements which is coupled by the desired output line will have net flux changes induced in them and all other elements will have zero net flux change. If for some reason outputs were desired or permitted on two or more of the output windings, the above requirement would be modified accordingly.

The only limitation on the output winding pattern is that it be one which will permit a net voltage to be induced in only one of the output windings by the net flux changes in the magnetic elements caused by any desired combination of input signals. Again, if simultaneous outputs are desired or are permitted on two or more output windings, the above requirement would be modified accordingly.

While the invention has been particularly shown and described with reference to preferred embodiments thereof, it will be understood by those skilled in the art that various changes in form and details may be made therein without departing from the spirit and scope of the invention.

I claim:

1. A magnetic switch comprising a plurality of magnetic elements at least some of which are stable only at a near zero remanent induction level, said elements being arranged in groups of at least two elements each; a plurality of input windings each of which couples elements of more than one group and couples only one element of each of said groups of elements in accordance with an input combinational code; means for coincidently energizing selected combinations of said input windings, said elements being responsive to the energization of said selected input windings to provide a net flux change in only the elements of one of said groups of elements; and a plurality of output windings, said output windings being divided into a plurality of sets, all the output windings in each of said sets coupling all the magnetic elements of each of said groups of magnetic elements in accordance with an output combinational code, the sense in which said output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

2. A magnetic switch comprising a plurality of magnetic elements at least some of which are stable only at a near zero remanent induction level, said elements being arranged in groups of $m$ elements each, where $m$ is an integral power of 2; a plurality of input windings each of which couples elements of more than one group and couples only one element of each of said groups of elements in accordance with an input combinational code; means for coincidently energizing selected combinations of said input windings, said elements being responsive to the energization of said selected input windings to provide a net flux change in only the elements of one of said groups of elements; and a plurality of output windings, said output windings being divided into a plurality of sets, each of said sets having $m$ output windings, all the output windings in each of said sets coupling all the magnetic elements of each of said groups of magnetic elements in accordance with an output combinational code, said output combinational code for each group of output windings being developed by expanding a matrix having the pattern $$\begin{array}{c|c} 1 & 1 \\ \hline 1 & 0 \end{array}$$

into a $m$ power matrix, the sense in which said output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

3. A magnetic switch comprising a plurality of magnetic elements at least some of which are stable only at a near zero remanent induction level, said elements being arranged in groups of at least two elements each; a plurality of input windings, each of which couples elements of more than one group and couples only one element of each of said groups of elements in accordance with an input combinational code, said input windings being divided into a plurality of sets, all the input windings in each of said sets coupling one magnetic element from each of said groups of magnetic elements in accordance with said input combinational code, said input combinational code being such that half the input windings coupling each magnetic element couple said each magnetic element in a first magnetizing sense and the other half of said input windings couple said each magnetic element in a second magnetizing sense; means for coincidentally energizing selected combinations of said input windings, said elements being responsive to the energization of said selected input windings to provide a net flux change in only the elements of one of said groups of elements; and a plurality of output windings, all the elements from each one of said groups of elements being coupled by at least one of said output windings in accordance with an output combinational code, the sense in which said output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

4. A magnetic switch comprising a plurality of magnetic elements at least some of which are stable only at a near zero remanent induction level, said elements being arranged in groups of at least two elements each, there being at least $n$ of said groups, where $n$ is an integral power of 2; a plurality of input windings, each of which couples elements of more than one group and couples only one element of each of said groups of elements in accordance with an input combinational code, said input windings being divided into a plurality of sets, where the number of input windings in each set of input windings is equal to $2n$, all the input windings in each of said sets coupling one magnetic element from each of said groups of magnetic elements in accordance with said input combinational code, said input combinational code for each group of input windings being developed by expanding a matrix having the pattern

| | |
|---|---|
| 1 | 1 |
| 1 | 0 |

into an $n$ power matrix with the pattern so formed being used for half the input windings and the complement of that pattern for the other half; means for coincidentally energizing selected combinations of said input windings, said elements being responsive to the energization of said selected input windings to provide a net flux change in only the elements of one of said groups of elements; and a plurality of output windings, all the elements from each one of said groups of elements being coupled by at least one of said output windings in accordance with an output combinational code, the sense in which said individual output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

5. A magnetic switch comprising a plurality of magnetic elements at least some of which are stable only at a near zero remanent induction level, said elements being arranged in groups of at least two elements each, there being $2^x-1$ groups of magnetic elements, where $x$ is a positive integer; a plurality of input windings, each of which couples elements of more than one group and couples only one element of each of said groups of elements in accordance with an input combinational code, said input windings being divided into a plurality of sets, each said set of input windings having $2^x$ windings, all the input windings in each of said sets coupling one magnetic element from each of said groups of magnetic elements in accordance with an input combinational code such that half the input windings coupling each magnetic element couple it in a first magnetizing sense and the other half of said input winding couple said magnetic element in a second magnetizing sense, said input combinational code for each group of input windings being developed by starting with a basic pattern

| |
|---|
| 1 |
| 0 |

where each horizontal row represents an input winding forming two columns of the next higher order pattern by use of the matrix expansion

| II column basic pattern | III column basic pattern |
|---|---|
| basic pattern | complement of basic pattern |

adding ones and zeroes to the respective ends of the basic pattern until the total number of digits in the column equals that in the two new columns, using this newly formed pattern as the first column of the next higher order winding pattern, and following this method until the number of digits in each column equals $2^x$, each column of the preceding order pattern being used in place of the basic pattern in the above matrix to form two succeeding columns of the next higher order pattern; means for coincidently energizing selected combinations of said input windings, said elements being responsive to the energization of said selected input windings to provide a net flux change in only the elements of one of said groups of elements; and a plurality of output windings, all the elements from each one of said groups of elements being coupled by at least one of said output windings in accordance with an output combinational code, the sense in which said output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

6. A magnetic switch comprising a plurality of magnetic elements at least some of which are stable only at a near zero remanent induction level, said elements being arranged in groups of at least two elements each; a plurality of input windings, each of which couples elements of more than one group and couples only one element of each of said groups of elements in accordance with an input combinational code, said input windings being divided into a plurality of sets, said number of sets of input windings being equal to $(p+1)$ where $p$ is a prime number and $(p+1)$ is equal to a multiple of four, the number of said groups of magnetic elements being equal to $p$, all the input windings in each of said sets coupling one magnetic element from each of said groups of magnetic elements in accordance with said input combinational code, said input combinational code being such that half the input windings coupling each magnetic element couple it in a first magnetizing sense and the other half of said input windings couple said magnetic element in a second magnetizing sense, said input combinational code being the one which is arrived at when (1) the quadratic residues of numbers from 0 to $(p-1)$ are formed, (2) the sequence $a_0$, $a_1$, $a_2$, $a_3$ . . . $a_{p-1}$ is laid out in a column and a one inserted for $a_0$ wherever the subscribe equals a quadratic residue and a zero in all other places, (3) the sequence obtained in step 2 is cyclically shifted to obtain a $p$ by $p$ matrix and (4) a row of 0's is added at the end of the matrix obtained in step 3; means for coincidentally energizing selected combinations of said input windings, said elements being responsive to the energization of said selected input windings to provide a net flux change in only the elements of one of said groups of elements; and a plurality of output windings, all the elements from each one of said groups of elements being coupled by at least one of said output windings in accordance with an output combinational code, the sence in which said individual output windings couple said magnetic elements being such that, for the energization of each selected combination of said input windings, the resulting net flux changes in the elements of one of said groups of elements will induce a net voltage in only one of the output windings coupling said group and cancelling voltages in all other output windings coupling the group.

7. A magnetic switch comprising a plurality of magnetic elements at least some of which are capable of producing in an associated winding an output voltage of either of two opposite polarities, said magnetic elements being grouped in a plurality of rows, a plurality of input windings coupled to said elements in accordance with an input combinational code, the sense of coupling of half the input windings with any element being opposite to the sense of coupling of the other half of the windings with the same element, means for coincidently exciting selected combinations of said input windings, each said selected combination having all of the windings coupled to one element from each row coupled thereto in the same sense, the windings of each selected combination having, on the other elements to which they are coupled, as many couplings of one sense as of the other sense whereby coincident excitation of a selected combination is effective to magnetically excite only a single selected element from each row of elements, a plurality of output windings coupled to said elements, at least some of said output windings being coupled to one element from each row, at least some of said elements having as many output windings coupled thereto as there are rows of elements, the sense of couplings of the several output windings with the several elements being such that upon excitation of one element from each row only one output winding has induced therein voltages of aiding polarity and all other output windings coupled to the excited elements will have induced therein as many voltages of one polarity as the other polarity.

References Cited in the file of this patent

UNITED STATES PATENTS

| | | |
|---|---|---|
| 2,733,860 | Rajchman | Feb. 7, 1956 |
| 2,734,182 | Rajchman | Feb. 7, 1956 |
| 2,768,367 | Rajchman | Oct. 26, 1956 |
| 2,964,238 | King et al. | Dec. 13, 1960 |
| 2,973,506 | Newby | Feb. 28, 1961 |